(12) United States Patent
Chang et al.

(10) Patent No.: US 10,021,279 B2
(45) Date of Patent: Jul. 10, 2018

(54) IMAGE CAPTURING DEVICE WITH SLANTWISE SURFACE

(71) Applicant: ABILITY ENTERPRISE CO., LTD., New Taipei (TW)

(72) Inventors: Yen-Min Chang, New Taipei (TW); Ling-Wei Yeh, New Taipei (TW); Yi-Ping Huang, New Taipei (TW)

(73) Assignee: ABILITY ENTERPRISE CO., LTD., New Taipei (TW)

( * ) Notice: Subject to any disclaimer, the term of this patent is extended or adjusted under 35 U.S.C. 154(b) by 5 days.

(21) Appl. No.: 15/130,910

(22) Filed: Apr. 15, 2016

(65) Prior Publication Data

US 2016/0316115 A1    Oct. 27, 2016

(30) Foreign Application Priority Data

Apr. 24, 2015  (TW) .............................. 104113193 A

(51) Int. Cl.
*H04N 5/225*        (2006.01)

(52) U.S. Cl.
CPC ......... *H04N 5/2252* (2013.01); *H04N 5/2253* (2013.01); *H04N 5/2254* (2013.01)

(58) Field of Classification Search
CPC ... H04N 5/2252; H04N 5/2253; H04N 5/2254
See application file for complete search history.

(56) References Cited

U.S. PATENT DOCUMENTS

| | | | | |
|---|---|---|---|---|
| 6,980,735 B2* | 12/2005 | Horiguchi | .............. | G03B 17/02 348/333.02 |
| 7,711,396 B2* | 5/2010 | Kim | .................... | H04B 1/3833 379/433.01 |
| 2001/0036845 A1* | 11/2001 | Park | .................... | H04M 1/0216 455/566 |
| 2003/0118340 A1* | 6/2003 | Horiguchi | .............. | G03B 17/02 396/429 |
| 2005/0009383 A1* | 1/2005 | Okura | ................ | H01R 13/6275 439/74 |
| 2005/0126320 A1* | 6/2005 | Cheng | .................... | G03B 17/02 74/63 |
| 2005/0250532 A1* | 11/2005 | Hwang | ............... | H04M 1/0235 455/550.1 |
| 2006/0121947 A1* | 6/2006 | Lee | .................... | H04M 1/0214 455/566 |
| 2006/0135222 A1* | 6/2006 | Kim | .................... | H04M 1/0247 455/575.1 |
| 2007/0177051 A1* | 8/2007 | Hsiao | .................. | H04N 5/2252 348/373 |
| 2007/0218723 A1* | 9/2007 | Kim | .................... | H04M 1/0247 439/142 |
| 2010/0302110 A1* | 12/2010 | Leem | .................... | H01Q 1/243 343/702 |
| 2011/0059780 A1* | 3/2011 | Taguchi | ................ | G06F 1/1616 455/575.1 |

* cited by examiner

*Primary Examiner* — Lin Ye
*Assistant Examiner* — John H Morehead, III
(74) *Attorney, Agent, or Firm* — Rabin & Berdo, P.C.

(57) ABSTRACT

An image capturing device includes a first housing and a second housing. The first housing includes a first axis and a first slantwise surface. The second housing includes a second axis and a second slantwise surface. When the first housing is at a first state, the first axis and the second axis are substantially parallel to each other. When the first housing is not at the first state, the first axis and the second axis are nonparallel.

22 Claims, 7 Drawing Sheets

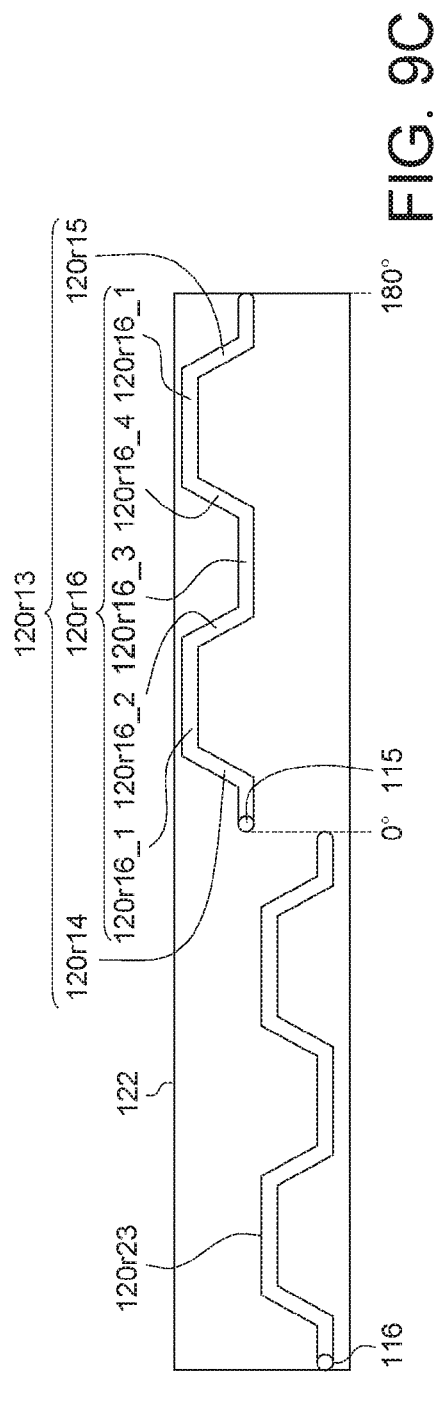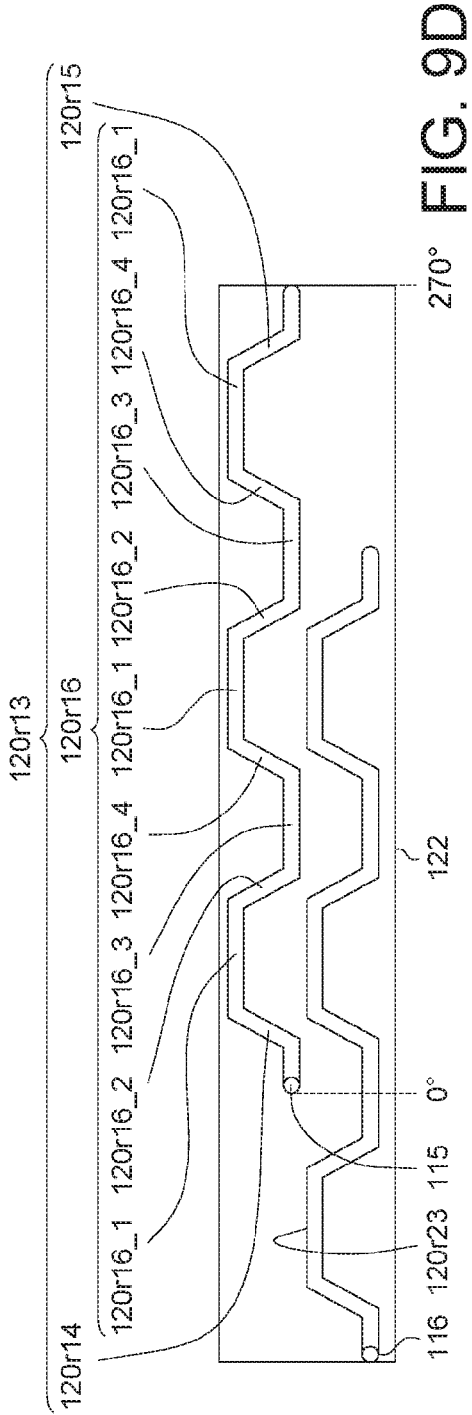

IMAGE CAPTURING DEVICE WITH SLANTWISE SURFACE

This application claims the benefit of Taiwan application Serial No. 104113193, filed Apr. 24, 2015, the subject matter of which is incorporated herein by reference.

BACKGROUND OF THE INVENTION

Field of the Invention

The invention relates in general to an image capturing device, and more particularly to an image capturing device including two rotatable components.

Description of the Related Art

An image capturing device includes a lens structure and an image sensor. The lens structure is capable of focusing an image on the image sensor, and then the image sensor converts the optical image signals into electrical signals. With the trend of wearable technology, the image capturing device is commonly mounted on the wearable device or vehicle.

However, the entire exterior of the image capturing device is constant, thus resulting in a poor match between the image capturing device and the wearable device or vehicle. Therefore, it has become an imminent task to provide a new image capturing device capable of enhancing the match between the image capturing device and the wearable device or vehicle.

SUMMARY OF THE INVENTION

The invention is directed to an image capturing device capable of enhancing the match between the image capturing device and the carrier mounting the same.

According to one embodiment of the present invention, an image capturing device is provided. The image capturing device includes a first housing and a second housing. The first housing includes a first axis and a first slantwise surface. The second housing includes a second axis and a second slantwise surface. When the first housing is at a first state, the first axis and the second axis are substantially parallel to each other. When the first housing is not at the first state, the first axis and the second axis are nonparallel.

According to another embodiment of the present invention, an image capturing device is provided. The image capturing device includes a first housing and a second housing. The first housing includes a first axis and a first slantwise surface. The second housing includes a second axis and a second slantwise surface relatively rotatable with the first slantwise surface.

The above and other aspects of the invention will become better understood with regard to the following detailed description of the preferred but non-limiting embodiment(s). The following description is made with reference to the accompanying drawings.

BRIEF DESCRIPTION OF THE DRAWINGS

FIG. 9C is an expansion diagram of the first sliding groove and the second sliding groove when central angles of the first sliding groove and the second sliding groove are approximately 180 degrees according to other embodiment of the present invention.

FIG. 9D is an expansion diagram of the first sliding groove and the second sliding groove when central angles of the first sliding groove and the second sliding groove are approximately 270 degrees according to other embodiment of the present invention.

DETAILED DESCRIPTION OF THE INVENTION

Figure 1:
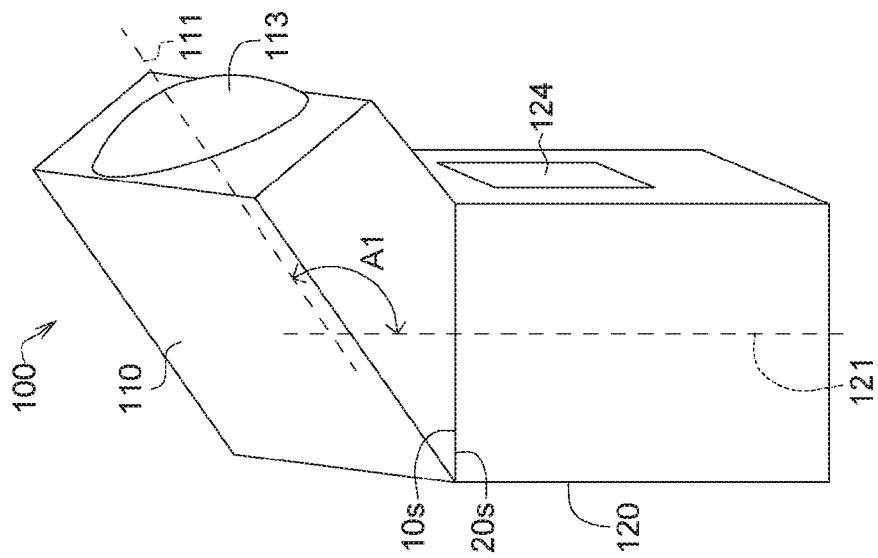
FIG. 1 is a schematic diagram of an image capturing device at a first state according to an embodiment of the present invention.
Figure 2:
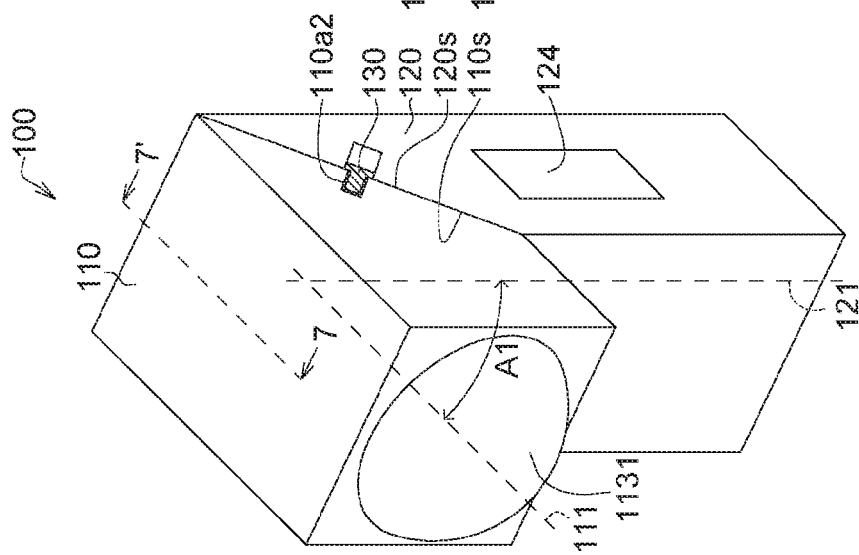
FIG. 2 is a schematic diagram of the image capturing device at a second state.
Figure 3:
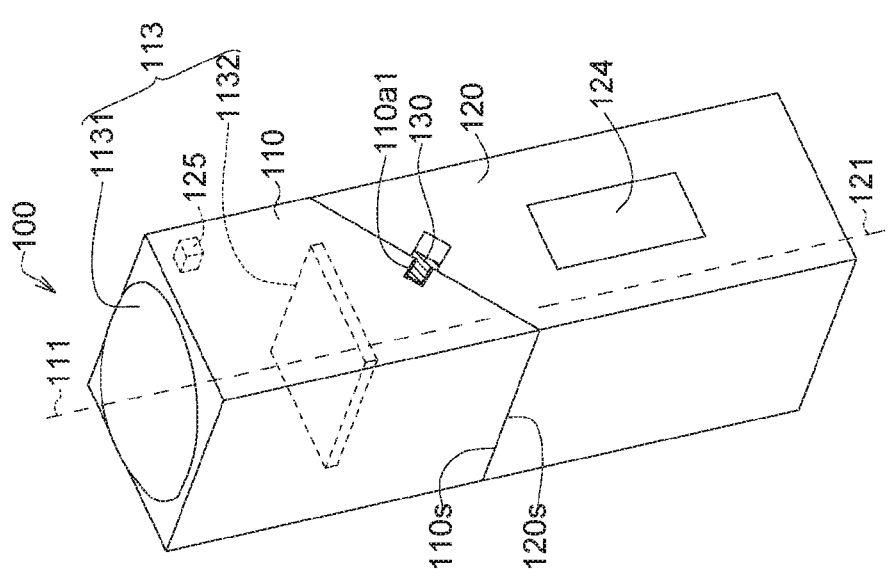
FIG. 3 is a schematic diagram of the image capturing device at a third state.
Figure 4:
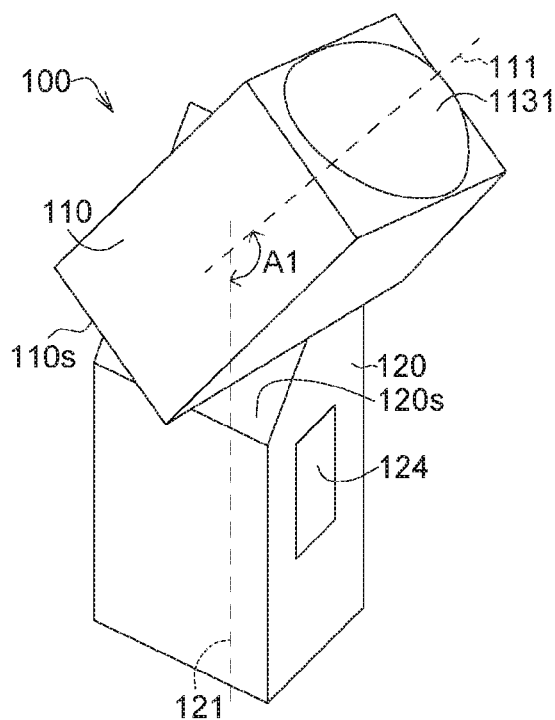
FIG. 4 is a schematic diagram of the image capturing device at a fourth state.

FIG. 1 is a schematic diagram of an image capturing device 100 at a first state according to an embodiment of the present invention. FIG. 2 is a schematic diagram of the image capturing device 100 at a second state. FIG. 3 is a schematic diagram of the image capturing device 100 at a third state. FIG. 4 is a schematic diagram of the image capturing device 100 at a fourth state. The image capturing device 100 may capture images at a plurality of states.

As shown in FIGS. 1-4, the image capturing device 100 includes a first housing 110, a second housing 120, an angle detecting module 125 and a joint portion 130. The first housing 110 and the second housing 120 may be electrically connected to each other. The joint portion 130 may be disposed on the second housing 120. The angle detecting module 125 may be disposed on the first housing 110. But the present invention is not limited thereto, the angle detecting module 125 may be disposed on the second housing 120 as well.

Figure 5:
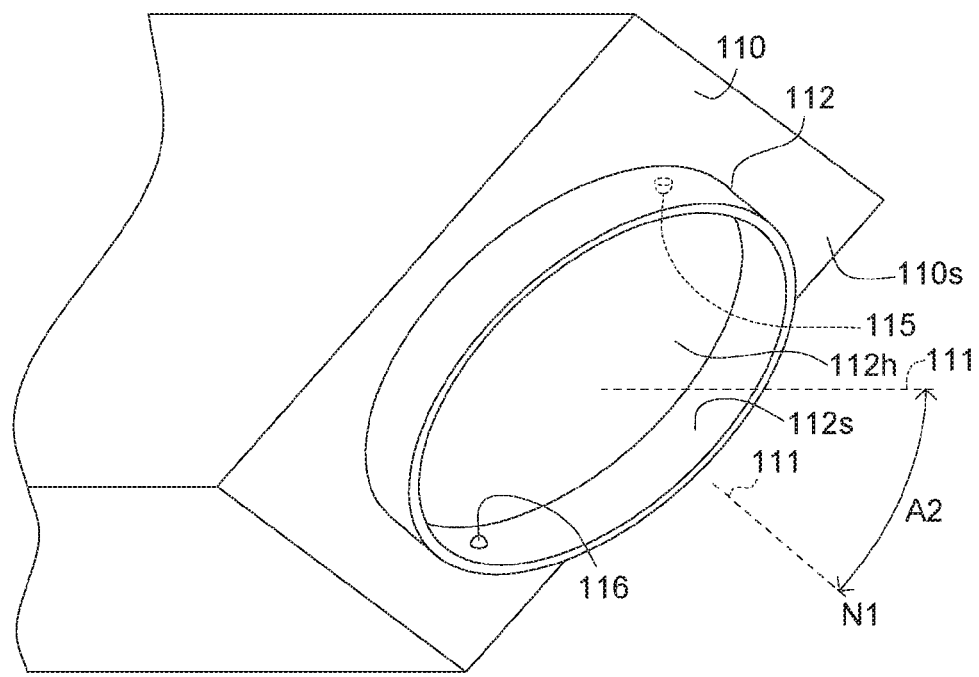
FIG. 5 is a schematic diagram of a first housing of the image capturing device at the second state.
Figure 6:
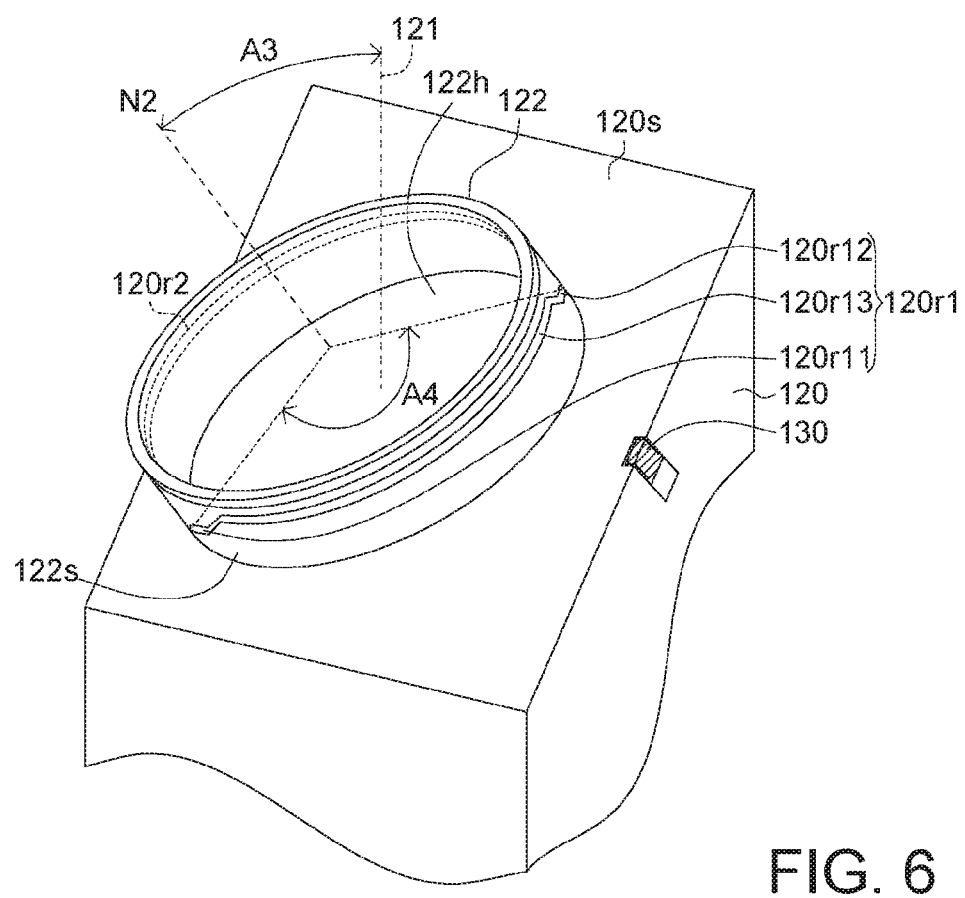
FIG. 6 is a schematic diagram of a second housing of the image capturing device at the second state.

FIG. 5 is a schematic diagram of the first housing 110 of the image capturing device 100 at the second state. FIG. 6 is a schematic diagram of the second housing 120 of the image capturing device 100 at the second state. As shown in FIGS. 1-6, in one embodiment, the first housing 110 includes a first axis 111 and a first slantwise surface 110s, and the second housing 120 includes a second axis 121 and a second slantwise surface 120s. The first slantwise surface 110s is disposed opposite to the second slantwise surface 120s. An included angle A1 is formed between the first axis 111 and the second axis 121. In another embodiment, the first housing 110 and the second housing 120 may relatively rotate with each other in accordance with the first slantwise surface 110s and the second slantwise surface 120s, such that the included angle A1 between the first axis 111 and the second axis 121 changes, thereby making the image capturing device 100 at the plurality of states.

Furthermore, the first housing 110 and the second housing 120 further respectively include a first engaging portion 112 and a second engaging portion 122 disposed opposite to each other. The first engaging portion 112 and the second engaging portion 122 may be disposed between the first slantwise surface 110s and the second slantwise surface 120s, and respectively disposed on the first slantwise surface 110s and the second slantwise surface 120s. For example, the first engaging portion 112 is disposed on the first slantwise surface 110s, and the second engaging portion 122 is disposed on the second slantwise surface 120s.

In one embodiment, the first housing 110 and the second housing 120 may be movable together with the first engaging portion 112 and the second engaging portion 122 in accordance with the first slantwise surface 110s and the second slantwise surface 120s, such that the first axis 111 and the second axis 121 (i.e., the first housing 110 and the second housing 120) have the plurality of states. In addition, the first housing 110 the second housing 120 are fixed by the joint portion 130, such that the image capturing device 100 is at one of the states, while the included angle A1 is formed between the first axis 111 and the second axis 121. The included angle A1 may change within a certain range of angles.

For instance, the slopes of the first slantwise surface 110s and the second slantwise surface 120s are about 45 degrees. As shown in FIG. 1, taking the state of the image capturing device 100 as a first state for example, the first axis 111 and the second axis 121 are substantially parallel to each other, while the included angle A1 is approximately 0 degrees. As shown in FIG. 2, taking the state of the image capturing device 100 as a second state for example, the first axis 111 and the second axis 121 are substantially perpendicular to each other, while the included angle A1 is approximately 90 degrees. As shown in FIG. 3, taking the state of the image capturing device 100 as a third state for example, the included angle A1 between the first axis 111 and the second axis 121 is approximately 135 degrees. As shown in FIG. 4, taking the state of the image capturing device 100 as a fourth state for example, the included angle A1 between the first axis 111 and the second axis 121 is approximately greater than 135 degrees. In one embodiment, the third state and the fourth state may be an intermediate transition state. For example, during the transition from the first state to the second state, the image capturing device 100 will be sequentially transformed from the first state into the third state and the fourth state, and then transformed into the second state.

Of course, the image capturing device 100 may also be sequentially transformed from the second state into the fourth state and the third state, and then transformed into the first state during the transition from the second state to the first state.

Furthermore, the image capturing device 100 may also be transformed between the first state and the third state, or between the first state and the fourth state, or even between the first state and one of the plurality of states. The direction of rotation of the first axis 111 and the second axis 121 in the foregoing embodiments may be clockwise or counterclockwise. In one embodiment, as for the first axis 111 and the second axis 121, when the image capturing device 100 is at the first state, the first axis 111 and the second axis 121 are substantially parallel to each other. When the image capturing device 100 is at the second state, the third state or the fourth state, the first axis 111 and the second axis 121 are nonparallel. During the transition from the first state to the second state, or during the transition from the second state to the first state, the first axis 111 and the second axis 121 are nonparallel.

In another embodiment, when the image capturing device 100 has a plurality of states, that is, when the first slantwise surface 110s and the second slantwise surface 120s relatively rotate with each other, the included angle A1 formed between the first axis 111 and the second axis 121 has multi-angles for being adjusted. As for the change of the included angle A1, the included angle A1 is changed from 0 degrees to an angle greater than 135 degrees, and then to 135 degrees, and finally to 90 degrees. Alternatively, the included angle A1 may be changed from 90 degrees to 135 degrees, and then to an angle greater than 135 degrees, and finally to 0 degrees. In another embodiment, the third state or the fourth state may be a stationary state respectively. That is, when the image capturing device 100 is at the third state or the fourth state, the first housing 110 and the second housing 120 are relatively fixed with each other. Of course, the image capturing device 100 may be selectively transformed into one of the plurality of states according to users' needs. But the present invention is not limited to the first state, the second state, the third state or the fourth state.

As shown in FIGS. 1 and 2, the first housing 110 has a first engaging groove 110a1 and a second engaging groove 110a2. The first engaging groove 110a1 and the second engaging groove 110a2 are respectively disposed on two different surfaces of the first housing 110, such as two opposite surfaces or two adjacent surfaces, but the present invention is not limited thereto. Herein, the first engaging groove 110a1 and the second engaging groove 110a2 may be disposed on two opposite surfaces of the first housing 110. When the image capturing device 100 is at the first state, the joint portion 130 engages to the first engaging groove 110a1. As shown in FIG. 2, when the image capturing device 100 is at the second state, the joint portion 130 engages to the second engaging groove 110a2. According to the above, due to design of the joint portion 130, the first engaging groove 110a1 and the second engaging groove 110a2, the image capturing device 100 may be capable of fixing the first housing 110 and the second housing 120 at different states.

As shown in FIG. 1, the first housing 110 includes an image capturing module 113. The image capturing module 113 includes a lens 1131 and an image capturing unit 1132. The image capturing unit 1132 captures an image through the lens 1131. The image capturing unit 1132 is, for example, a charge-coupled device (CCD). In that the first housing 110 and the second housing 120 may relatively rotate with each other in accordance with the first slantwise surface 110s and the second slantwise surface 120s to adjust the included angle A1 formed between the first axis 111 and the second axis 121, the lens 1131 may thus selectively face towards different orientations. That is, when the image capturing device 100 is selected to be transformed into one of the plurality of states, the lens 1131 may find views towards different directions.

As shown in FIG. 1, the angle detecting module 125 is used for detecting the state of the image capturing device 100. The image capturing device 100 or the second housing 120 may convert the image captured by the first housing 110 according to the result detected from the angle detecting module 125. For instance, the image capturing device 100 or the second housing 120 converts the captured image into a longitudinal image. Besides, the angle detecting module 125 may be an element with function of detecting orientations, such as an acceleration detector or a gyroscope.

In addition, as shown in FIG. 1, the second housing 120 further includes a control module 124. The control module 124 includes at least one control key electrically connected to the first housing 110. The first housing 110 may start or stop capturing an image by operating the control module 124.

As shown in FIGS. 5 and 6, the first engaging portion 112 has a opening 112h and an inner side 112s. The second engaging portion 122 has a second opening 122h. The first engaging portion 112 is disposed on the first slantwise surface 110s, and the second engaging portion 122 is disposed on the second slantwise surface 120s. The first engaging portion 112 and the second engaging portion 122 connect with each other and may relatively slide with each other, such that the first housing 110 and the second housing 120 may relatively rotate with each other to exhibit one of the plurality of states. Besides, the slope of the first slantwise surface 110s is approximately equal to the slope of the second slantwise surface 120s. The slopes of the first slantwise surface 110s and the second slantwise surface 120s in the image capturing device 110 may be selectively changed according to users' needs, such that the image capturing device 100 has more varieties of different states to be chosen when the first housing 110 and the second housing 120 rotate relatively.

As shown in FIGS. 5 and 6, a first angle A2 is formed between a normal direction N1 of the first slantwise surface 110s and the first axis 111. In one embodiment, the first angle A2 is exemplified as 45 degrees. In another embodiment, the first angle A2 may be smaller than 45 degrees or greater than 45 degrees. A second angle A3 is formed between a normal direction N2 of the second slantwise surface 120s and the second axis 121. The second angle A3 is exemplified as 45 degrees. In yet another embodiment, the second angle A3 may be smaller than 45 degrees or greater than 45 degrees. In one embodiment, the first angle A2 and the second angle A3 are substantially the same. For instance, the first angle A2 and/or the second angle A3 may be an acute angle, an obtuse angle or a right angle. Because the first angle A2 and the second angle A3 are substantially the same, the slopes of the first slantwise surface 110s and the second slantwise surface 120s are substantially the same.

Furthermore, as shown in FIGS. 5 and 6, the first housing 110 and the second housing 120 respectively include at least one sliding member and at least one sliding groove. For example, the first housing may include at least one sliding member, and the second housing may include at least one sliding groove. Alternatively, the first housing may include at least one sliding groove, and the second housing may include at least one sliding member. In one embodiment, the first housing 110 includes a first sliding member 115 and a second sliding member 116. The first sliding member 115 and the second sliding member 116 are respectively disposed on the inner side 112s of the first opening 112h of the first engaging portion 112. The second housing 120 includes a first sliding groove 120r1 and a second sliding groove 120r2. The first sliding groove 120r1 and the second sliding groove 120r2 are provided on an outer side 122s of the second engaging portion 122. The first sliding groove 120r1 includes a first groove 120r11, a second groove 120r12 and a connecting groove 120r13 disposed between the first groove 120r11 and the second groove 120r12. Besides, a central angle A4 of two ends of the first sliding groove 120r1 (i.e., the end of the first groove 120r11 and the end of the second groove 120r12) relative to a center of the second engaging portion 122 is substantially smaller than or equal to 360 degrees. Moreover, the first housing 110 and the second housing 120 may correspondingly adjust the angle of the central angle A4 according to the foregoing slope of the first slantwise surface 110s and the foregoing slope of the second slantwise surface 120s, or according to a distance between the two ends of the first sliding groove 120r1 or a distance between two ends of the second sliding groove 120r2.

Figure 7:
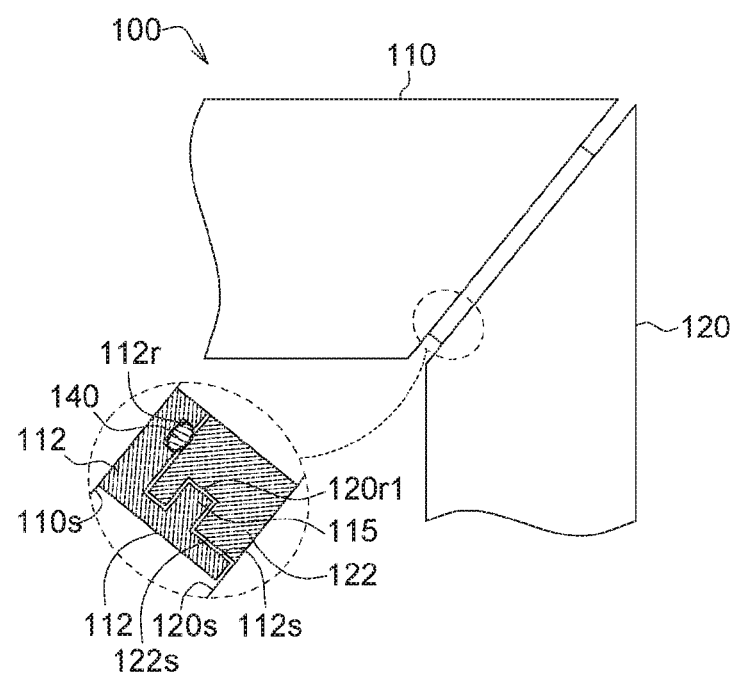
FIG. 7 is a cross-sectional view of the image capturing device at the second state along a direction 7-7'.

FIG. 7 is a cross-sectional view of the image capturing device 100 at the second state along a direction 7-7'. When the first housing 110 and the second housing 120 connect with each other, the first sliding member 115 is movably disposed in the first sliding groove 120r1. Thus, the first engaging portion 112 connects to and relatively rotates with the second engaging portion 122, so as to adjust the angle of the included angle A1 according to the position of the first sliding member 115 moving in the first sliding groove 112r1. Similarly, although not illustrated, the second sliding member 116 may be disposed within the second sliding groove 120r2. In one embodiment, the first housing 110 and the second housing 120 may have one set or more than one set of the sliding member and the sliding groove respletively. Therefore, the first housing 110 and the second housing 120 may also respletively omit the second sliding member 116 and the second sliding groove 120r2, or may further add another set of the sliding member and the sliding groove. That is, the first engaging portion 112 and the second engaging portion 122 connect with each other only in accordance with one set of the sliding member and the sliding groove. Alternatively, the first engaging portion 112 and the second engaging portion 122 may connect with each other in accordance with three sets or more than three sets of the sliding member and the sliding groove.

As shown in FIG. 7, the image capturing device 100 includes a press member 140, which is located between the first housing 110 and the second housing 120 and may be fixed inside a first receiving groove 112r of the first engaging portion 112. When the first engaging portion 112 and the second engaging portion 122 connect with each other, the press member 140 is disposed between the first engaging portion 112 and the second engaging portion 122, and has a press state and a free state. When being at the press state, that is, the press member 140 is tightly pressed in the first receiving groove 112r and may prevent impurities (such as moisture or solid particles) outside of the image capturing device 100 from entering the interior of the image capturing device 100. Besides, due to the press member 140 tightly pressed in the first receiving groove 112r, the press member 140 provides the first engaging portion 112 and the second engaging portion 122 with a rotation frictional force, thereby increasing the rotational resistance between the first engaging portion 112 and the second engaging portion 122. Furthermore, the press member 140 may form a closed ring structure. Under such a design, the first receiving groove 112r may be a closed ring groove. Alternatively, the press member 140 may consist of a plurality of sub-press members separated from each other. Under such a design, the first receiving groove 112r may include a plurality of sub-receiving grooves separated from each other.

Figure 8A:
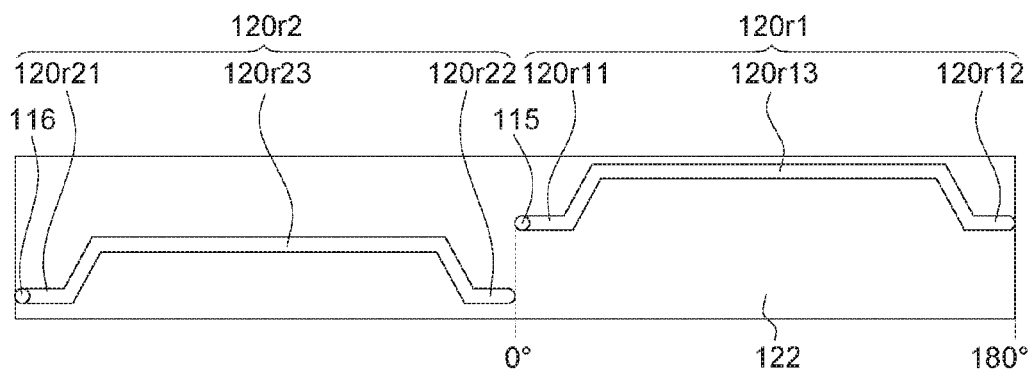
FIG. 8A is an expansion diagram showing the relative position of a first sliding member, a second sliding member, a first sliding groove and a second sliding groove when the image capturing device is at the first state.
Figure 8B:
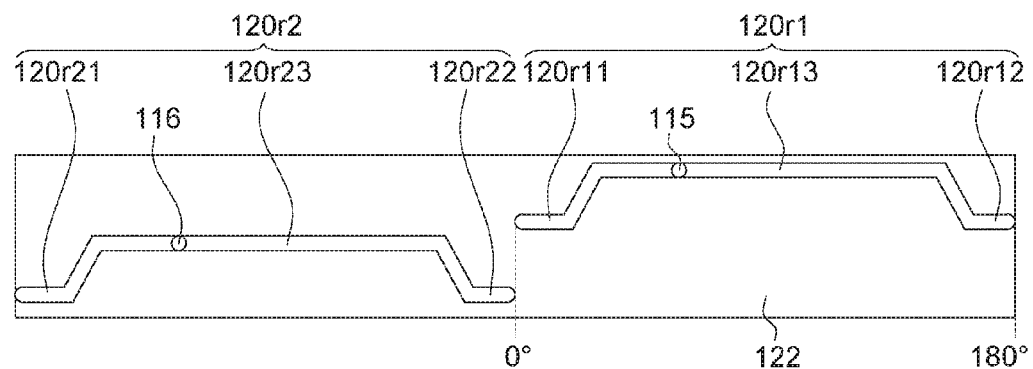
FIG. 8B is an expansion diagram showing the relative position of the first sliding member, the second sliding member, the first sliding groove and the second sliding groove when the image capturing device is at an intermediate state between the first state and the second state.
Figure 8C:
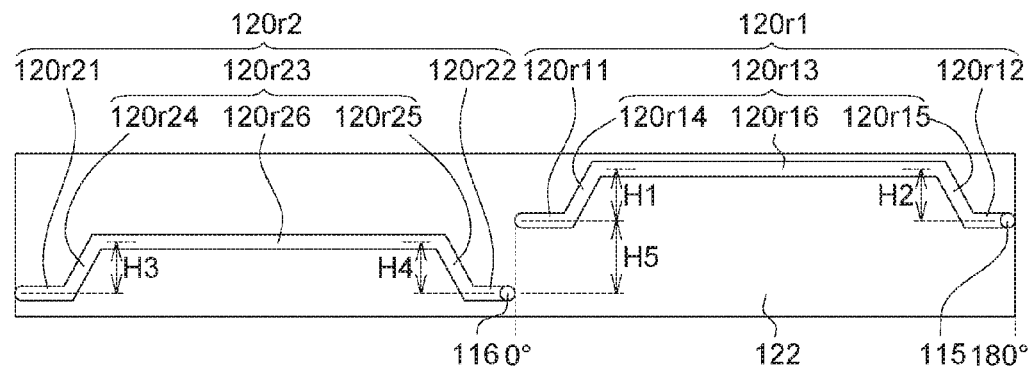
FIG. 8C is an expansion diagram showing the relative position of the first sliding member, the second sliding member, the first sliding groove and the second sliding groove when the image capturing device is at the second state.

FIGS. 8A-8C are expansion diagrams showing the relative position of the first sliding member 115, the second sliding member 116, the first sliding groove 120r1 and the second sliding groove 120r2 when the image capturing device 100 is at the first state, the third state (i.e., the process between the first state and the second state) and the second state.

Refer to FIGS. 7 and 8A-8C at the same time. The second sliding groove 120r2 includes a first groove 120r21, a second groove 120r22 and a connecting groove 120r23 connecting the first groove 120r21 and the second groove 120r22. When the first housing 110 and the second housing 120 are relatively rotatable with each other, the first sliding member 115 is movably disposed in the first sliding groove 120r1, and the second sliding member 116 is movably disposed in the second sliding groove 120r2. When the image capturing device 100 is at the first state, the first sliding member 115 may be located in the first groove 120r11, the second sliding member 116 may be located in the first groove 120r21, and the press member 140 is at the press state between the first engaging portion 112 and the second engaging portion 122. When the image capturing device 100 is transformed from the first state into the third state, that is, during the period that the first sliding member 115 and the second sliding member 116 respectively move from the first groove 120r11 and the first groove 120r21 to the connecting groove 120r13 and the connecting groove 120r23, the first slantwise surface 110s of the first housing 110 and the second slantwise surface 120s of the second housing 120 are far away from each other. Thus, the second engaging portion 122 and the press member 140 are detached from each other, thereby making the press member 140 at the free state. At this time, the first housing 110 and the second housing 120 may rotate freely without being affected by the resistance of the press member 140.

As shown in FIGS. 8B and 8C, when the image capturing device 100 is transformed from the third state into the second state, that is, during the period that the first sliding member 115 and the second sliding member 116 respectively move from the connecting groove 120r13 and the connecting groove 120r23 to the second groove 120r12 and the second groove 120r22, the first engaging portion 112 and the second engaging portion 122 press the press member 140 into the first receiving groove 112r, thereby making the press member 140 at the press state.

Refer to FIGS. 7-8C at the same time. The connecting groove 120r13 includes two sub-slanting grooves and a sub-connection groove. Each sub-slanting groove is respectively disposed between the sub-connection groove and the first groove and between the sub-connection groove and the second groove. The sub-connection groove and each sub-slanting groove are nonparallel. For instance, the connecting groove 120r13 includes a first sub-slanting groove 120r14, a second sub-slanting groove 120r15 and a third sub-connection groove 120r16. The first sub-slanting groove 120r14 is disposed between the third sub-connection groove 120r16 and the first groove 120r11, thereby making the first sliding member 115 prevent from directly moving from the first groove 120r11 to the second groove 120r12. Instead, the first sliding member 115 will move from the first groove 120r11 through the first sub-slanting groove 120r14 to the third sub-connection groove 120r16, thereby making the press member 140 return from the press state to the free state. Similarly, the second sub-slanting groove 120r15 is disposed between the third sub-connection groove 120r16 and the second groove 120r12, such that the first sliding member 115 may move from the third sub-connection groove 120r16 through the second sub-slanting groove 120r15 to the second groove 120r12, thereby making the press member 140 be transformed from the free state into the press state.

Besides, in another embodiment, the connecting groove 120r23 includes a first sub-slanting groove 120r24, a second sub-slanting groove 120r25 and a third sub-connection groove 120r26. The first sub-slanting groove 120r24 is disposed between the third sub-connection groove 120r26 and the first groove 120r21, such that the second sliding member 116 move from the first groove 120r21 through the first sub-slanting groove 120r24 to the third sub-connection groove 120r26, thereby making the press member 140 return from the press state to the free state. Similarly, the second sub-slanting groove 120r25 is disposed between the third sub-connection groove 120r26 and the second groove 120r22, such that the second sliding member 116 moves from the third sub-connection groove 120r26 through the second sub-slanting groove 120r25 to the second groove 120r22, thereby making the press member 140 be transformed from the free state into the press state. Additionally, the first sub-slanting groove 120r24, the second sub-slanting groove 120r25 and the third sub-connection groove 120r26 are nonparallel.

As shown in FIG. 8C, a spacing is formed between the third sub-connection groove 120r16 and the first groove 120r11 and between the third sub-connection groove 120r16 and the second groove 120r12. For instance, a first spacing H1 is formed between the third sub-connection groove 120r16 and the first groove 120r11, and a second spacing H2 is formed between the third sub-connection groove 120r16 and the second groove 120r12. The first spacing H1 of the first groove 120r11 and the third sub-connection groove 120r16 is substantially equal to the second spacing H2 of the second groove 120r12 and the third sub-connection groove 120r16. Thus, the path of the first sliding member 115 moving from the first groove 120r11 to the third sub-connection groove 120r16 is approximately equal to the path of the first sliding member 115 moving from the third sub-connection groove 120r16 to the second groove 120r12. Similarly, a third spacing H3 is formed between the third sub-connection groove 120r26 and the first groove 120r21, and a fourth spacing H4 is formed between the third sub-connection groove 120r26 and the second groove 120r22. The third spacing H3 is substantially equal to the fourth spacing H4. Thus, the path of the second sliding member 116 moving from the first groove 120r21 to the third sub-connection groove 120r26 is approximately equal to the path of the second sliding member 116 moving from the third sub-connection groove 120r26 to the second groove 120r22.

As shown in FIG. 8C, the first sliding groove 120r1 and the second sliding groove 120r2 may not communicate with each other and be separated by an interval. For instance, the first sliding groove 120r1 and the second sliding groove 120r2 are separated from each other by a fifth interval H5 along an axis of rotation of the second engaging portion 122. Under such a design, when the first sliding member 115 moves from the first groove 120r11 to the second groove 120r12, the first housing 110 and the second housing 120 relatively rotate with each other by 180 degrees substantially. That is, the central angle A4 of the two ends of the first sliding groove 120r1 relative to the center of the second engaging portion 122 is substantially 180 degrees. In another embodiment, the central angle A4 of the two ends of the first sliding groove 120r1 relative to the center of the second engaging portion 122 may be smaller than or equal to 360 degrees. The central angle A4 of the two ends of the first sliding groove 120r1 relative to the center of the second engaging portion 122 and a central angle of the two ends of the second sliding groove 120r2 relative to the center of the second engaging portion 122 (not designated) are substantially the same. For example, the central angle A4 is approximately 180 degrees. Correspondingly, the first sliding member 115 and the second sliding member 116 are separated from each other by the identical fifth interval H5 along an axis of rotation of the first engaging portion 112. Additionally, the first sliding member 115 and the second sliding member 116 respectively connect with the first sliding groove 120r1 and the second sliding groove 120r2.

Figure 9A:
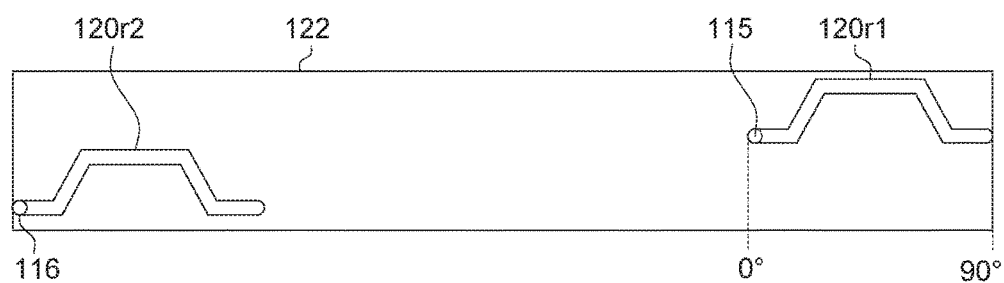
FIG. 9A is an expansion diagram of the first sliding groove and the second sliding groove when central angles of the first sliding groove and the second sliding groove are approximately 90 degrees according to other embodiment of the present invention.
Figure 9B:
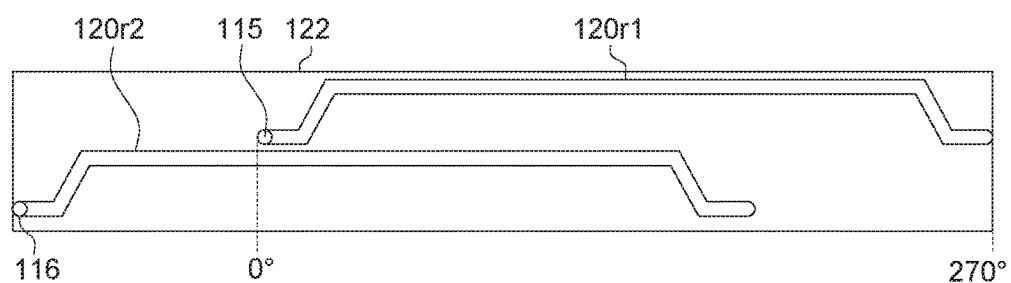
FIG. 9B is an expansion diagram of the first sliding groove and the second sliding groove when central angles of the first sliding groove and the second sliding groove are approximately 270 degrees according to other embodiment of the present invention.

Furthermore, the central angle A4 of the first sliding groove 120r1 and the central angle of the second sliding groove 120r2 in the embodiment of the present invention are not limited to 180 degrees. FIG. 9A is an expansion diagram of the first sliding groove 120r1 and the second sliding groove 120r2 when central angle of the first sliding groove 120r1 and the central angle of the second sliding groove 120r2 are approximately 90 degrees according to other embodiment of the present invention. FIG. 9B is an expansion diagram of the first sliding groove 120r1 and the second sliding groove 120r2 when central angle of the first sliding groove 120r1 and the central angle of the second sliding groove 120r2 are approximately 270 degrees according to other embodiment of the present invention. FIG. 9C is an expansion diagram of the first sliding groove 120r1 and the second sliding groove 120r2 when central angle of the first sliding groove 120r1 and the central angle of the second sliding groove 120r2 are approximately 180 degrees according to other embodiment of the present invention. FIG. 9D is an expansion diagram of the first sliding groove 120r1 and the second sliding groove 120r2 when central angle of the first sliding groove 120r1 and the central angle of the second sliding groove 120r2 are approximately 270 degrees according to other embodiment of the present invention.

As shown in FIG. 9A, for example, the central angle of the first sliding groove 120r1 and the central angle of the second sliding groove 120r2 are approximately 90 degrees. As shown in FIG. 9B, for example, the central angle of the first sliding groove 120r1 and the central angle of the second sliding groove 120r2 are approximately 270 degrees. The way of the first sliding member 115 and the second sliding member 116 respectively disposed and moving in the first sliding groove 120r1 and the second sliding groove 120r2 is similar to that one of the above embodiments, and is not repeated here.

As shown in FIG. 9C, for example, the central angle of the first sliding groove 120r1 and the central angle of the second sliding groove 120r2 are approximately 180 degrees. In one embodiment, the connecting groove 120r13 includes a plurality of sub-slanting grooves and sub-connection grooves. Each of the sub-connection grooves is respectively disposed between each of the sub-slanting grooves. Two of the sub-slanting grooves respectively connect to the first groove and the second groove. Each of the sub-slanting grooves and each of the sub-connection grooves are nonparallel. For instance, the connecting groove 120r13 includes a first sub-slanting groove 120r14, a second sub-slanting groove 120r15, two fourth sub-connection grooves 120r16_1, a fifth sub-slanting groove 120r16_2, a sixth sub-connection groove 120r16_3 and a seventh sub-slanting groove 120r16_4. The two fourth sub-connection grooves 120r16_1 are respectively disposed between the first sub-slanting groove 120r14 and the fifth sub-slanting groove 120r16_2 and between the seventh sub-slanting groove 120r16_4 and the second sub-slanting groove 120r15. The sixth sub-connection groove 120r16_3 is disposed between the fifth sub-slanting groove 120r16_2 and the seventh sub-slanting groove 120r16_4. The two fourth sub-connection grooves 120r16_1 and the sixth sub-connection groove 120r16_3 are substantially parallel to each other. When the first sliding member 115 moves through the fifth sub-slanting groove 120r16_2, the sixth sub-connection groove 120r16_3 and the seventh sub-slanting groove 120r16_4, this process may carry out a stepwise hand feeling for adjustment. That is, for the first housing 110 and the second housing 120, there may be a plurality of states to be selected. Besides, the structure of the connecting groove 120r23 as shown in FIG. 9C is similar to that one of the connecting groove 120r13, and is not repeated here.

As shown in FIG. 9D, for example, the central angle of the first sliding groove 120r1 and the central angle of the second sliding groove 120r2 are approximately 270 degrees. Similar to the embodiment of FIG. 9C, in this embodiment, the connecting groove 120r13 includes a first sub-slanting groove 120r14, a second sub-slanting groove 120r15, three fourth sub-connection grooves 120r16_1, two fifth sub-slanting grooves 120r16_2, two sixth sub-connection grooves 120r16_3 and two seventh sub-slanting grooves 120r16_4. When the first sliding member 115 moves in the first sliding groove 120r1, that is, during the period that the first housing 110 and the second housing 120 relatively rotate substantially by 270 degrees, this process may carry out at least two stepwise hand feelings for adjustment. That is, the first housing 110 and the second housing 120 may include at least two kinds of states. Besides, the structure of the connecting groove 120r23 as shown in FIG. 9D is similar to that one of the connecting groove 120r13, and is not repeated here.

It may be known from above disclosure that the central angle of the first sliding groove 120r1 and/or the central angle of the second sliding groove 120r2 may be an angle from 0 to 360 degrees, and/or the first sliding groove 120r1 and/or the second sliding groove 120r2 may include designs of a singular stepwise hand feeling or a plural stepwise hand feeling for adjustment, such that the first housing 110 and the second housing 120 include a plural kinds of states.

Figure 10A:
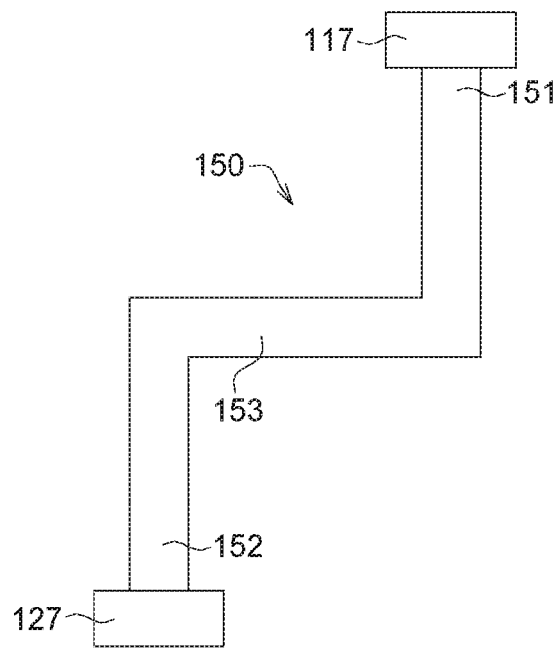
FIG. 10A is a schematic diagram of a flexible printed circuit board electrically connecting to the first housing and the second housing according to an embodiment of the present invention.
Figure 10B:
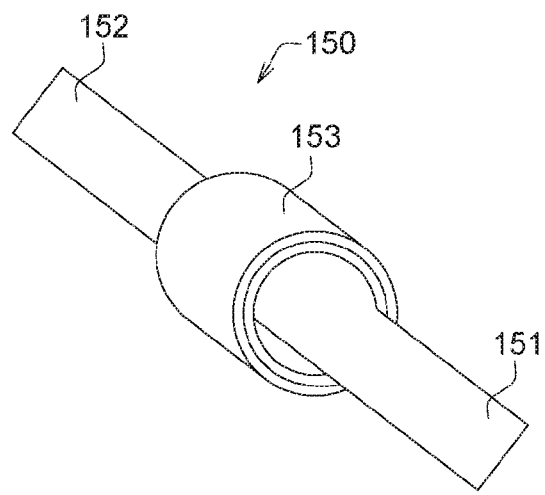
FIG. 10B is a schematic diagram of the flexible printed circuit board which is winding according to an embodiment of the present invention.

FIG. 10A is a schematic diagram of a flexible printed circuit board electrically connecting to the first housing 110 and the second housing 120 according to an embodiment of the present invention. FIG. 10B is a schematic diagram of the flexible printed circuit board which is winding in FIG. 10A. The image capturing device 100 further includes a flexible printed circuit board 150. The first housing 110 and the second housing 120 respectively include a first printed circuit board 117 and a second printed circuit board 127. In one embodiment, the flexible printed circuit board 150 may electrically connect the first printed circuit board 117 and the second printed circuit board 127 through the first opening 112h and the second opening 122h. In another embodiment, the flexible printed circuit board 150 includes a first connecting portion 151, a second connecting portion 152 and a winding portion 153. The winding portion 153 may connect the first connecting portion 151 and the second connecting portion 152. The first connecting portion 151 may electrically connect to the interior element of one of the first housing 110 and the second housing 120. The second connecting portion 152 may electrically connect to the interior element of the other one of the first housing 110 and the second housing 120. For instance, the first connecting portion 151 and the second connecting portion 152 of the flexible printed circuit board 150 respectively and electrically connect to the first printed circuit board 117 and the second printed circuit board 127. Of course, the interior element of the second housing 120 may be totally or partially disposed on the second printed circuit board 127, and the interior element of the first housing 110, the image capturing module 113, the lens 1131 and the image capturing unit 1132 may be totally or partially disposed on the first printed circuit board 117, and the angle detecting module 125 may be disposed on the first printed circuit board 117 or the second printed circuit board 127.

The winding portion 153 of the flexible printed circuit board 150 may be wound to be as the state of FIG. 10B. Thus, when the first housing 110 and the second housing 120 relatively rotate with each other, the winding portion 153 of the flexible printed circuit board 150 may be wound and deformed accordingly. Simultaneously, in that the first printed circuit board 117 and the second printed circuit board 127 to which the first connecting portion 151 and the second connecting portion 152 respectively connect are fixed on the first housing 110 and the second housing 120, the first connecting portion 151 and the second connecting portion 152 are not wound according to the relative rotation of the first housing 110 and the second housing 120. Therefore, it may prevent the first housing 110 and the second housing 120 from rotating too much, or continuing to be transformed into a few of selected states. For example, when the first housing 110 and the second housing 120 are transformed between the first state, the second state and the fourth state over and over again, it may result in the first connecting portion 151 and the second connecting portion 152 being detached from the first housing 110 and the main body, making the flexible printed circuit board 150 damage.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An image capturing device, comprising:
a first housing comprising a first axis and a first slantwise surface; and
a second housing comprising a second axis and a second slantwise surface;
wherein when the first housing is at a first state, the first axis and the second axis are substantially parallel to each other, and when the first housing is not at a first state, the first axis and the second axis are nonparallel;
wherein the first housing and the second housing comprise a first sliding groove and a first sliding member respectively, the first sliding member being movably disposed in the first sliding groove, and the first housing and the second housing are rotatable relative to each other with a relative angular displacement of the first sliding member and the first sliding groove.

2. The image capturing device according to claim 1, wherein the first housing and the second housing respectively comprise a first engaging portion and a second engaging portion relatively rotatable with each other, the first engaging portion and the second engaging portion are disposed on the first slantwise surface and the second slantwise surface, respectively, and the first housing and the second housing are movable together with the first engaging portion and the second engaging portion in accordance with the first slantwise surface and the second slantwise surface.

3. The image capturing device according to claim 2, wherein the first sliding groove and the first sliding member are respectively disposed on the first engaging portion and the second engaging portion.

4. The image capturing device according to claim 3, wherein the first sliding groove comprises a first groove, a second groove and a connecting groove disposed between the first groove and the second groove, and the first sliding member is movable between the first groove and the second groove in accordance with the connecting groove.

5. The image capturing device according to claim 4, wherein the connecting groove comprises two sub-slanting grooves and a sub-connection groove, the two sub-slanting grooves are respectively disposed between the sub-connection groove and the first groove and between the sub-connection groove and the second groove, and the two sub-slanting grooves and the sub-connection groove are nonparallel.

6. The image capturing device according to claim 4, wherein the connecting groove comprises a plurality of sub-slanting grooves and a plurality of sub-connection grooves, the sub-connection grooves are respectively disposed between the sub-slanting grooves, two of the sub-slanting grooves connect to the first groove and the second groove, respectively, and the sub-slanting grooves and the sub-connection grooves are nonparallel.

7. The image capturing device according to claim 3, wherein the first housing and the second housing comprise a second sliding groove and a second sliding member, respectively, the second sliding member and the second sliding groove are respectively disposed on the first engaging portion and the second engaging portion, and the second sliding member is movably disposed in the second sliding groove.

8. The image capturing device according to claim 1, further comprising a flexible printed circuit board, wherein the first housing and the second housing comprise a first printed circuit board and a second printed circuit board, respectively, and the flexible printed circuit board electrically connects the first printed circuit board and the second printed circuit board.

9. The image capturing device according to claim 1, wherein the first housing or the second housing comprises the first sliding groove and a second sliding groove; and the first sliding groove is separated from the second sliding groove by an interval.

10. The image capturing device according to claim 1, further comprising a flexible printed circuit board, wherein the flexible printed circuit board comprises a first connecting portion, a second connecting portion and a winding portion connecting the first connecting portion and the second connecting portion, the first housing and the second housing comprise a first printed circuit board and a second printed circuit board, respectively, and the first connecting portion and the second connecting portion electrically connect to the first printed circuit board and the second printed circuit board, respectively.

11. An image capturing device, comprising:
a first housing comprising a first axis and a first slantwise surface; and
a second housing comprising a second axis and a second slantwise surface relatively rotatable with the first slantwise surface;
wherein the first housing and the second housing comprise a first sliding groove and a first sliding member respectively, the first sliding member being movably disposed in the first sliding groove, and the first housing and the second housing are rotatable relative to each other with a relative angular displacement of the first sliding member and the first sliding groove.

12. The image capturing device according to claim 11, wherein the first housing and the second housing respectively comprise a first engaging portion and a second engaging portion relatively rotatable with each other, the first engaging portion and the second engaging portion are disposed on the first slantwise surface and the second slantwise surface, respectively, and the first housing and the second housing are movable together with the first engaging portion and the second engaging portion in accordance with the first slantwise surface and the second slantwise surface.

13. The image capturing device according to claim 12, wherein the first sliding groove and the first sliding member are disposed on the first engaging portion and the second engaging portion, respectively.

14. The image capturing device according to claim 13, wherein the first sliding groove comprises a first groove, a second groove and a connecting groove disposed between the first groove and the second groove, and the first sliding member is movable between the first groove and the second groove in accordance with the connecting groove.

15. The image capturing device according to claim 14, wherein the connecting groove comprises two sub-slanting grooves and a sub-connection groove, the two sub-slanting grooves are respectively disposed between the sub-connection groove and the first groove and between the sub-connection groove and the second groove, and the two sub-slanting grooves and the sub-connection groove are nonparallel.

16. The image capturing device according to claim 14, wherein the connecting groove comprises a plurality of sub-slanting grooves and a plurality of sub-connection grooves, the sub-connection grooves are respectively disposed between the sub-slanting grooves, two of the sub-slanting grooves respectively connect to the first groove and the second groove, and the sub-slanting grooves and the sub-connection grooves are nonparallel.

17. The image capturing device according to claim 13, wherein the first housing and the second housing comprise a second sliding groove and a second sliding member, respectively, the second sliding member and the second sliding groove are disposed on the first engaging portion and the second engaging portion, respectively, and the second sliding member is movably disposed in the second sliding groove.

18. The image capturing device according to claim 11, further comprising a flexible printed circuit board, wherein the first housing and the second housing comprise a first printed circuit board and a second printed circuit board, respectively, and the flexible printed circuit board electrically connects the first printed circuit board and the second printed circuit board.

19. The image capturing device according to claim 11, further comprising a flexible printed circuit board, wherein the flexible printed circuit board comprises a first connecting portion, a second connecting portion and a winding portion connecting the first connecting portion and the second connecting portion, the first housing and the second housing comprise a first printed circuit board and a second printed circuit board, respectively, and the first connecting portion and the second connecting portion electrically connect to the first printed circuit board and the second printed circuit board, respectively.

20. The image capturing device according to claim 11, wherein the first housing or the second housing comprises the first sliding groove and a second sliding groove; and the first sliding groove is separated from the second sliding groove by an interval.

21. An image capturing device, comprising:
a first housing comprising a first axis, a first slantwise surface and a first engaging portion; and
a second housing comprising a second axis, a second slantwise surface corresponding to the first slantwise surface, and a second engaging portion;
wherein the first engaging portion and the second engaging portion comprise a first sliding groove and a first sliding member movably disposed in the first sliding groove respectively, and are disposed between the first slantwise surface and the second slantwise surface, and the first housing and the second housing are rotatable relative to each other with a relative angular displacement of the first sliding member and the first sliding groove.

22. An image capturing device, comprising:
a first housing comprising a first axis, a first slantwise surface and a first engaging portion disposed on the first slantwise surface; and
a second housing comprising a second axis, a second slantwise surface and a second engaging portion disposed on the second slantwise surface;
wherein the first engaging portion and the second engaging portion comprise a first sliding groove and a first sliding member movably disposed in the first sliding groove respectively, and an included angle is formed between the first axis and the second axis, and the first housing and the second housing are rotatable relative to each other with a relative angular displacement of the first sliding member and the first sliding groove.

* * * * *